Figure 1:
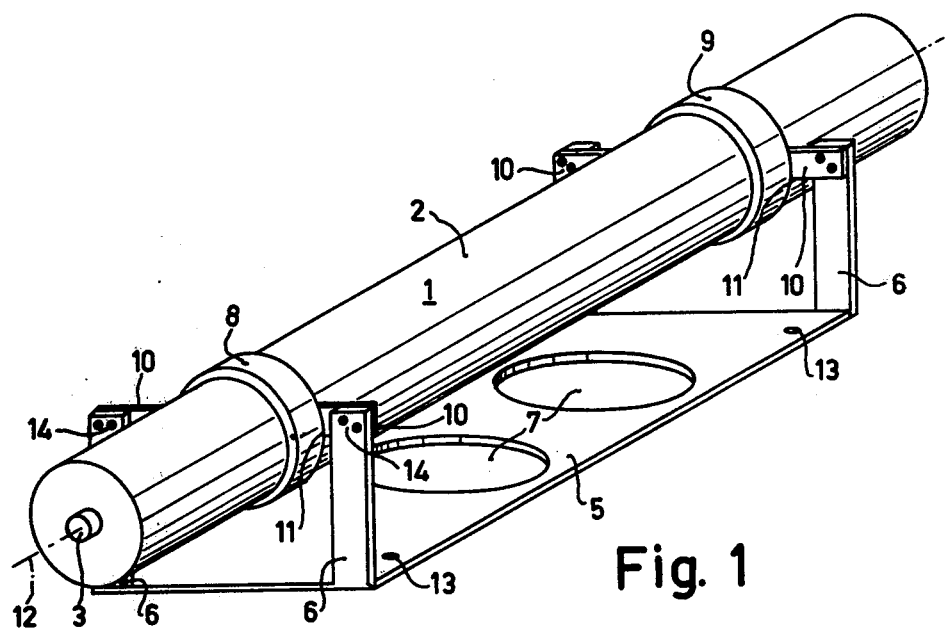

United States Patent [19]

Lamboo

[11] 4,142,702
[45] Mar. 6, 1979

[54] GAS DISCHARGE LASER DEVICE

[75] Inventor: Theodorus F. Lamboo, Eindhoven, Netherlands

[73] Assignee: U.S. Philips Corporation, New York, N.Y.

[21] Appl. No.: 804,721

[22] Filed: Jun. 8, 1977

[30] Foreign Application Priority Data

Apr. 22, 1977 [NL] Netherlands .......................... 7704397

[51] Int. Cl.² .............................................. H01S 3/02
[52] U.S. Cl. ...................................... 248/174; 248/49; 248/DIG. 1; 331/94.5 D
[58] Field of Search .......... 248/49, 54 R, 55, DIG. 1, 248/358 AA, 20, 350, 204, 127, 174, DIG. 9, 74 R; 331/94.5 D; 313/238, 269

[56] References Cited

U.S. PATENT DOCUMENTS

| B 398,488 | 2/1976 | Keever et al. .......................... 248/49 |
| 1,777,522 | 10/1930 | Hamilton et al. .............. 248/54 R X |
| 3,204,901 | 9/1965 | Dunn ................................... 248/54 R |
| 3,234,992 | 2/1966 | Denny et al. .................. 248/74 R X |
| 3,847,703 | 11/1974 | Kaiser .......................... 331/94.5 D X |
| 3,875,530 | 4/1975 | Manoukian ..................... 248/54 R X |
| 4,045,129 | 8/1977 | Hamar .......................... 331/94.5 D X |

FOREIGN PATENT DOCUMENTS

| 409602 | 5/1924 | Fed. Rep. of Germany ........... 248/204 |
| 1944958 | 1/1974 | Fed. Rep. of Germany. |
| 2219904 | 10/1975 | Fed. Rep. of Germany. |
| 2531027 | 1/1977 | Fed. Rep. of Germany .... 248/DIG. 1 |
| 2113804 | 6/1972 | France. |
| 815260 | 6/1959 | United Kingdom ............. 248/358 AA |

Primary Examiner—Rodney H. Bonck
Attorney, Agent, or Firm—William J. Streeter; Simon L. Cohen

[57] ABSTRACT

A holder supporting a gas laser holder has two pair of leaf springs, each pair being situated in a plane at right angles to the longitudinal axis of the gas discharge laser and on either side of said laser, thereby isolating the laser device from bending moments as a result of temperature gradients in the laser or holder.

10 Claims, 8 Drawing Figures

GAS DISCHARGE LASER DEVICE

The invention relates to a gas discharge laser device comprising a tubular gas discharge laser, a holder and suspension elements for connecting the laser to the holder.

Such as gas discharge laser device is disclosed in German Pat. No. 1,944,958 in which a gas discharge laser is mechanically vibration isolated from its holder by arranging the laser in the holder on three resilient rubber plugs. For many applications in which the emanating laser beam should have a very fixed position with respect to its surroundings, for example, in interferometers and in the so-called "Video Long Player" (an apparatus in which a disc comprising optical information is read by means of a laser beam), said method of connection does not provide sufficient isolation. The plugs permit a movement of the laser in nearly all directions, while in the case of shocks the laser will start vibrating with respect to its holder and its surroundings.

Published German Pat. Application 22 19 904 disclosed a $CO_2$ laser device in which the discharge tube and the mirror of the resonator are secured together by means of flexible clamps. The connection points are situated in the nodal points of the fundamental frequency of the resonator which is formed by the mirrors. By this measure according to said specification the transmission of acoustical vibrations from the holder to the resonator is strongly attenuated. In this case, a solution is given which only reduces the transmission of vibrations. If, however, the part of the laser tube between the two clamps expands as a result of heating of the laser tube, the laser tube will move with respect to the resonator mirrors.

In addition, many gas discharge lasers are known which are rigidly secured to the holder. Any difference in thermal expansion between the laser and the holder then is sufficient to vary the place, the direction and the power of the laser beam in various operating conditions.

It is therefore an object of the invention to provide a simple and economical gas discharge laser in which the place, the direction and the power of the laser beam vary minimum in various operating conditions.

According to the invention, a gas discharge laser device of the kind described in the first paragraph is characterized in that the suspension elements consist of at least two pairs of leaf springs and the leaf springs per pair are situated substantially in a plane at right angles to the longitudinal axis of the gas discharge laser and are secured to the gas discharge laser on either side of said laser.

The invention is based on the recognition of the fact that a holder has to be used which exerts substantially no forces on the laser which may give rise to deformation of the laser. The placed and the direction of the laser beam are fixed by the leaf springs. The connection is resilient in the longitudinal direction of the gas discharge laser. Said resilience and possible bending of the holder as a result of differences in expansion between the laser and the holder exert a negligible influence on the position and direction of the laser beam. Since the laser is not clamped rigidly, it does not bend and the power of the generated laser radiation remains substantially constant also in varying operating conditions.

The position and direction of the laser beam are influenced to the minimum extent when the points of engagement of all the leaf springs to the laser are situated in or near a plane which also comprises the longitudinal axis of the laser. The leaf springs may be secured to glass projections of the laser by means of an adhesive or by sealing. However, it is much simpler to provide two clamping bands around the laser to which the leaf springs are secured on either side of the gas discharge laser. The place of the clamping bands is preferably chosen to be so that the sagging of the gas discharge laser as a result of its own weight is minimum.

The clamping bands and the leaf springs are, preferably formed as one assembly. When at the point of transition from leaf spring to clamping band an aperture is provided in the material through which each leaf spring is secured to the clamping band in two places, the clamping band very readily engages the tubular gas discharge laser also near the leaf spring thereby preventing resilience in the plane through the pair of leaf springs at right angles to the longitudinal axis of the laser.

The leaf springs may be secured to the holder by means of a rapidly curing metal adhesive after having fixed the position and direction of the laser. However, said connection is preferably carried out by means of spot welding, which results in rapid and reliable connections, after having positioned the gas discharge laser in the holder.

In a preferred embodiment of the invention the holder comprises lugs which are situated substantially in the plane of a pair of leaf springs and to which the leaf springs are welded. Said lugs may be connected separately to the holder or be obtained by punching and may form one assembly with the holder. However, the holder preferably consists of an elongated plate which is provided at each end with two lugs which are bent substantially at right angles to the plane of the plate and to which the leaf springs are secured by spot welding. The points for the connection of the device in an apparatus are preferably situated near the lugs. In that case the results of any expansion of the holder and minimum. Moreover, the holder may be slightly curved or be bent between the two ends out of a plane through said connection points so as to compensate for thermal expansion of the holder. The holder may be constructed to be extra light by providing the plate from which it is manufactured with a number of apertures.

When the holder is manufactured with a U-shaped cross section, the holder has a larger rigidity. In that case the lugs for connecting the leaf springs may be bent from the side walls of the holder so that a simple and cheap construction is also obtained.

Figure 2:
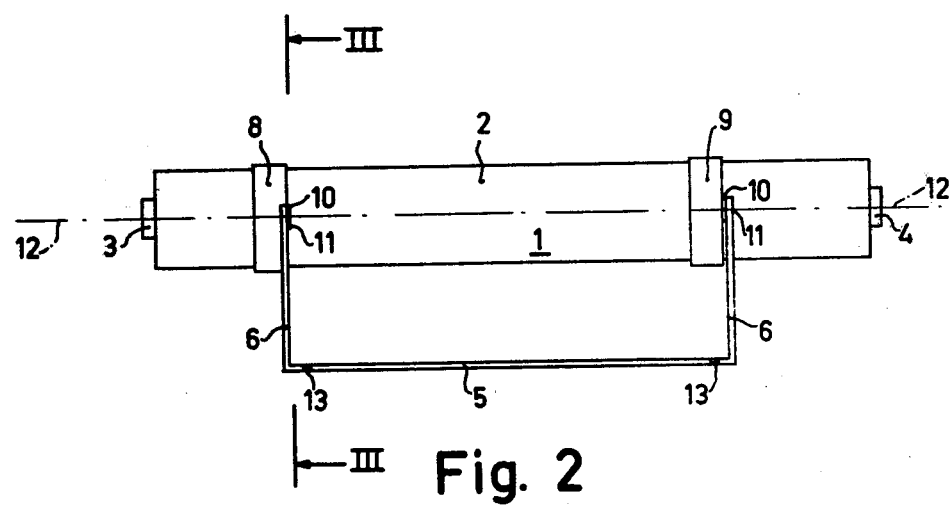
Figure 3:
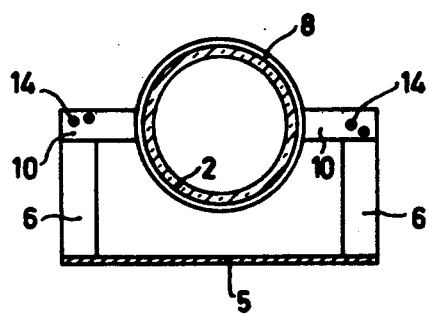
Figure 5:
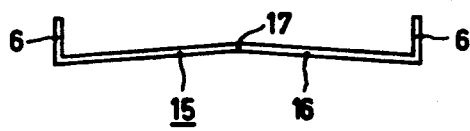
Figure 6:
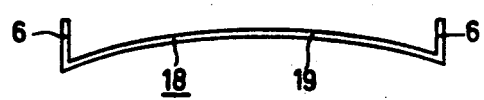
Figure 7:
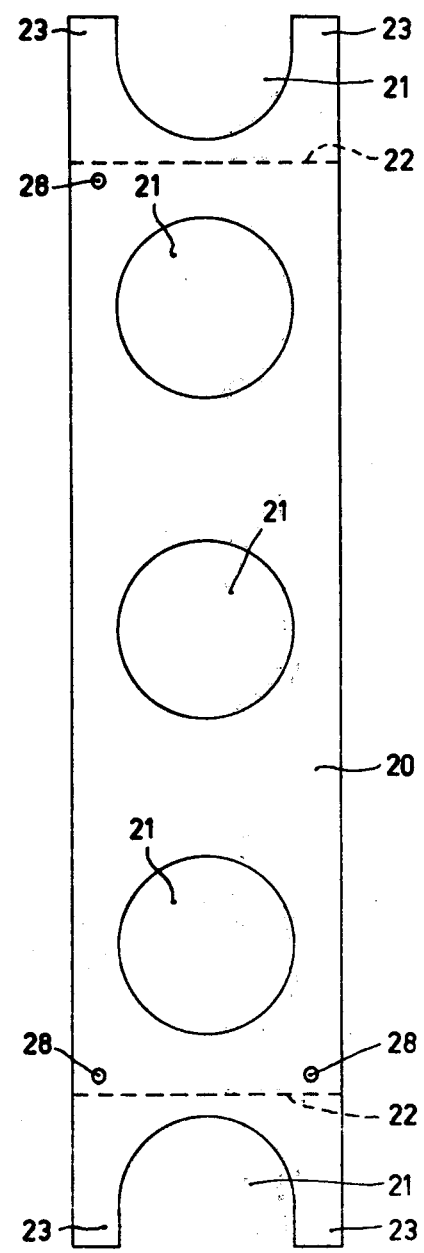
Figure 4:
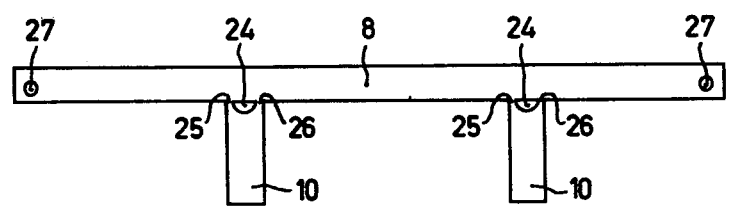
Figure 8:
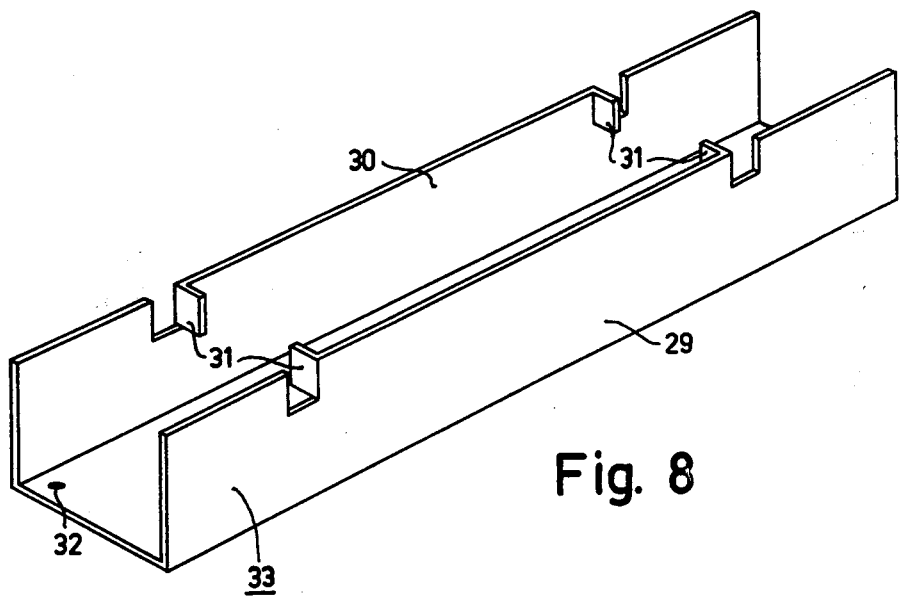

The invention will now be described in greater detail with reference to a drawing, in which FIG. 1 is a perspective view and FIG. 2 is a side elevation of a gas discharge laser device according to the invention, FIG. 3 is a sectional view of FIG. 2, FIG. 4 shows a clamping band with leaf springs, FIG. 5 and 6 are a side elevation of two preferred embodiments of the holder, FIG. 7 shows how a holder can be punched from one ribbon of metal, and FIG. 8 shows another type of holder.

FIG. 1 is a perspective view of a gas discharge laser device according to the invention. This device comprises a coaxial gas discharge laser 1 which consists of a glass tube 2 in which inter alia the electrodes (not shown) are present The ends of the tube are sealed and comprise the laser mirrors 3 and 4 (see also FIG. 2) with together constitute the laser resonator. The laser beam emanates through the laser mirror 3 which constitutes the coupling-out mirror. The laser 1 is secured in the holder 5 comprising lugs 6, said holder also comprising apertures 7 so as to keep it light and slack. Clamping bands 8 and 9 are provided around the laser 1 and comprises leaf springs 10. The leaf springs 10 belonging to one clamping band are situated in one plane which extends substantially at right angles to the axis 12 of the laser. As a result of this, the laser can move only in the direction of said axis and this has substantially no influence on the place and the direction of the laser beam. In this embodiment, the points of engagement of leaf springs to the clamping bands 8 are situated near a plane which also comprises the axis 12 of the laser. In the laser suspended in this manner the place and the direction of the beam are substantially constant. The place and the direction vary only within tolerance ranges of ± 10 μm and ± 0.1 mrad, respectively. The holder is secured, for example, in an interferometer or VLP disc player by means of the connection holes 13.

FIG. 3 is a sectional view of a gas discharge laser device shown in FIG. 2. The leaf springs 10 are welded to the lugs 6 by means of spot welds 14. Spot welding proves to be the handiest manner of connection. The laser is moved in the correct position with respect to the holder, after which a rapid and accurate spot welding joint is made. In this case the leaf springs 10 have been manufactured from sheet steel, 0.15 mm thick, and the holder is manufactured from stainless steel 1 mm thick.

FIG. 4 shows a clamping band 8 with leaf springs 10 formed as one assembly. The clamping band 8 is bent around the gas discharge laser after having bent the leaf springs 10 at right angles to the plane of the clamping band 8. By providing the aperture 24 in the material, two connection points 25 and 26 per leaf spring are obtained, both of which readily engage the gas discharge laser. The ends 27 are secured together, for example, by spot welding or by a bolt connection.

FIG. 5 is a side elevation of a preferred embodiment of a holder 15. The bottom plate 16 in this case has a bend 17 which produces an even more stable connection, since in the case of expansion, if any, of the holder the bend compensates for the variation in length.

FIG. 6 shows an embodiment of a holder 18 whose bottom plate 19 is curved. Said holder has the same extra properties as the holder shown in FIG. 5.

FIG. 7 shows how a holder can simply be manufactured from one assembly by punching. Starting material is a ribbon of steel, 45 mm wide, 200 mm long and 1 mm thick, in which a number of holes and recesses 21 are punched. The ends of ribbon are then bent 90° along the lines 22. The lugs 23 are then situated in planes which extend normal to the plane of the drawing.

The three connection points 28 in that case are holes with which the holder can be secured, for examples, in a VLP disc player by means of screws. Said connection points are situated near the lugs 23, so that any movement of the laser with respect to said points will be minimum even in the case of this slack holder.

FIG. 8 shows a holder having a U-shaped cross section 33. In such a holder the leaf springs 10 can be secured to the side walls 29 and 30, for example, in slots. Preferably, however, lugs 31 are bent from the side walls to which lugs the leaf springs 10 can be spot welded. The connection points 32 are no longer preferably situated near the lugs 31, since said holder has a sufficient rigidity.

What is claimed is:

1. A gas discharge laser device comprising a tubular gas discharge laser having a longitudinal axis, a holder, at least two pairs of bifurcated leaf springs connected to said holder, each pair of leaf springs being located in a plane substantially at right angles to the longitudinal direction of the gas discharge laser, and two clamping bands provided around the laser and attached to each of said leaf springs on either side of said laser through both bifurcations of each leaf spring, each band thereby forming an assembly with one pair of leaf springs.

2. A gas discharge laser device as claimed in claim 1, wherein the points of engagement of all the leaf springs to the holder are situated substantially in a plane including the longitudinal axis of the laser.

3. A gas discharge laser device as claimed in claim 1, wherein the leaf springs are welded to the holder by spot welding.

4. A gas discharge laser device as claimed in claim 3, wherein said holder is provided with lugs situated substantially in the planes of the pairs of leaf spring and welded to the leaf springs.

5. A gas discharge laser device as claimed in claim 4, wherein the holder comprises an elongated planar bottom plate provided with two lugs at each end, said lugs being bent substantially at right angles to the plane of the plate and spot welded to the leaf springs.

6. A gas discharge laser device as claimed in claim 5, wherein the bottom plate has a number of apertures.

7. A gas discharge laser device as claimed in claim 4, further comprising means situated near the lugs on the bottom plate for connecting the laser device to any given surface.

8. A gas discharge laser device as claimed in claim 7, wherein the bottom plate is slightly bent out of the plane through the connecting means substantially centrally between the two ends.

9. A gas discharge laser device as claimed in claim 7, wherein the bottom plate is slightly curved out of the plane through the connecting means.

10. A gas discharge laser device as claimed in claim 1, wherein the holder comprises a punched ribbon of metal.

* * * * *